(12) United States Patent
Lee et al.

(10) Patent No.: US 9,217,073 B2
(45) Date of Patent: Dec. 22, 2015

(54) TRANSPARENT AND FLAME RETARDING POLYESTER RESIN COMPOSITION AND PREPARATION METHOD THEREOF

(75) Inventors: Ji Young Lee, Suwon-si (KR); In Kim, Suwon-si (KR); Yeon Kyoung Jung, Suwon-si (KR); Manwar Hussain, Ansan-si (KR); Pil Joong Yoon, Ansan-si (KR); Keum Suk Seo, Ansan-si (KR)

(73) Assignees: SAMSUNG ELECTRONICS CO., LTD., Suwon-Si (KR); SHINIL CHEMICAL INDUSTRY CO., LTD., Ansan-Si (KR)

( * ) Notice: Subject to any disclaimer, the term of this patent is extended or adjusted under 35 U.S.C. 154(b) by 92 days.

(21) Appl. No.: 13/327,145

(22) Filed: Dec. 15, 2011

(65) Prior Publication Data

US 2012/0157607 A1    Jun. 21, 2012

(30) Foreign Application Priority Data

Dec. 17, 2010    (KR) .................. 10-2010-0129809

(51) Int. Cl.
| | |
|---|---|
| C08L 67/02 | (2006.01) |
| C08K 3/34 | (2006.01) |
| C08K 5/49 | (2006.01) |
| C08K 9/04 | (2006.01) |
| C08J 3/20 | (2006.01) |
| C08K 5/00 | (2006.01) |

(52) U.S. Cl.
CPC . *C08K 9/04* (2013.01); *C08J 3/203* (2013.01); *C08K 3/346* (2013.01); *C08K 5/0066* (2013.01); *C08K 5/49* (2013.01); *C08L 67/02* (2013.01); *C08J 2367/02* (2013.01)

(58) Field of Classification Search
CPC ..... C08L 67/02; C08L 67/03; C08L 2201/02; C08L 2201/10; C08L 2205/02; C08L 2205/025; C08K 3/346; C08K 5/006; C08K 5/49
USPC .................. 524/445–447; 525/444
See application file for complete search history.

(56) References Cited

U.S. PATENT DOCUMENTS 5,631,755 A * 5/1997 Sakaya et al. ............... 349/117
7,205,346 B2 * 4/2007 Harashina .................... 524/133
(Continued)

FOREIGN PATENT DOCUMENTS

| CN | 1509314 | 6/2004 |
|---|---|---|
| EP | 1 408 085 A1 | 4/2004 |

(Continued)

OTHER PUBLICATIONS

Chang (Nanocomposites of Poly(ethylene terephthalate-co-ethylene naphthalate) with Organoclay. Journal of Polymer Science: Part B: Polymer Physics. vol. 39, 2001, pp. 2581-2588).*

(Continued)

*Primary Examiner* — Brieann R Fink
(74) *Attorney, Agent, or Firm* — Staas & Halsey LLP

(57) ABSTRACT

A polyester resin composition having improved transparency, flame retardancy and hardness, and a method for preparation thereof are provided. The composition includes organo-modified nanoclay and a phosphorous-based flame retardant added to a polyester resin. The nanoclay is homogeneously dispersed in the polyester by melt compounding.

7 Claims, 7 Drawing Sheets

(56) References Cited

U.S. PATENT DOCUMENTS

| | | | |
|---|---|---|---|
| 7,300,703 B2* | 11/2007 | MacDonald et al. | 428/446 |
| 2002/0198331 A1* | 12/2002 | Nishihara et al. | 525/444 |
| 2004/0127611 A1* | 7/2004 | Yamanaka et al. | 524/116 |
| 2005/0282018 A1* | 12/2005 | Van Den Bergen et al. | 428/426 |
| 2007/0197696 A1* | 8/2007 | Mediratta et al. | 524/115 |
| 2007/0197738 A1* | 8/2007 | Ramaraju et al. | 525/437 |
| 2010/0113673 A1* | 5/2010 | Leu et al. | 524/445 |
| 2010/0190908 A1* | 7/2010 | Kumaki | 524/445 |

FOREIGN PATENT DOCUMENTS

| | | |
|---|---|---|
| JP | 2000-169727 | 6/2008 |
| JP | 2010-144129 | 7/2010 |
| KR | 10-2004-0007558 | 1/2004 |
| KR | 10-2008-0091328 | 10/2008 |

OTHER PUBLICATIONS

Office Action mailed Feb. 4, 2015 for corresponding Chinese Patent Application No. 201110405663.8.

* cited by examiner

TRANSPARENT AND FLAME RETARDING POLYESTER RESIN COMPOSITION AND PREPARATION METHOD THEREOF

CROSS-REFERENCE TO RELATED APPLICATIONS

This application is related to and claims priority to Korean Patent Application No. 10-2010-129809 filed on Dec. 17, 2010 with the Korean Intellectual Property Office, the disclosure of which is incorporated herein by reference.

BACKGROUND

1. Field

The embodiments discussed herein are related to a polyester resin composition with improved transparency, flame retardancy and hardness, and a method for preparation thereof.

2. Description of the Related Art

In recent years, with increased interest in the appearance of electronic/electric products, automobiles, office supplies, or the like, as well as performance thereof, transparent exterior housings are attracting more attention. In addition, in response to increased danger of fire, such electronic/electric products, automobiles, office supplies, or the like must be flame retardant.

Among transparent materials used in manufacturing exterior housings for existing electronic/electric products, automobiles, office supplies, or the like, polycarbonate (PC) or a blend containing PC, polymethacrylate (PMMA) or a blend containing PMMA, etc. are well known. However, polycarbonate has poor resistance to surface scratching and polymethacrylate has poor flame-retardancy.

Therefore, a PEN-PET copolymer resin or a improved polyester resin composition having favorable mechanical properties and embodying both transparency and flame retardancy is desired.

SUMMARY

According to an aspect of the present invention, a polyester resin composition with improved transparency, flame retardancy and hardness, as well as a method for preparation thereof is provided.

According to an exemplary embodiment of the present invention, a transparent and flame-retardant polyester resin composition includes a mixture of polyethylene terephthalate (PET) and polyethylene naphthalate (PEN) or a copolymer thereof, 0.05 to 5 wt. % of organo-modified nanoclay; 0.05 to 5 wt. % of a phosphorus based flame retardant in terms of phosphorous content; and 0.1 to 5 wt. % of a chain extender.

According to an exemplary embodiment, the organo-modified nanoclay may have a longitudinal size of 10 to 200 nm and be homogeneously dispersed in the mixture of PET and PEN or the copolymer thereof.

A mixing ratio by weight of PET to PEN may range from 1:9 to 9:1.

The phosphorous based flame retardant may be physically dispersed in the polyester resin composition or chemically reacted with the polyester resin composition.

The chain extender may be a chain extender having an epoxy functional group.

The transparent and flame-retardant polyester resin composition may include 0.05 to 5 wt. % of silane, a silane derivative, siloxane, a siloxane derivative, or the like.

The transparent and flame-retardant polyester resin composition may include 0.001 to 0.01 wt. % of a metal salt.

The transparent and flame-retardant polyester resin composition may include 0.05 to 5 wt. % of a thermal stabilizer.

According to an exemplary embodiment of the present invention, a method for preparation of a transparent and flame-retardant polyester resin composition includes introducing a mixture of PET and PEN or a copolymer thereof, organo-modified nanoclay, a phosphorous-based flame retardant and a chain extender into a twin-screw extruder, mixing, melting and compressing the mixture under agitation in the twin-screw extruder, exfoliating the organo-modified nanoclay by shear stress occurring during agitation, to a longitudinal size of 10 to 200 nm, and, homogeneously dispersing the same in the molten and compressed polyester resin, discharging the polyester resin, in which the nanoclay is homogeneously dispersed, under agitation, and pelletizing the discharged polyester resin composition.

According to an exemplary embodiment of the present invention, a method for preparation of a transparent and flame-retardant polyester resin composition includes introducing a mixture of PET and PEN or a copolymer thereof, a phosphorous-based flame retardant and a chain extender into a twin-screw extruder, mixing, melting and compressing the mixture under agitation in the twin-screw extruder, adding organo-modified nanoclay to the molten and compressed polyester resin, exfoliating the organo-modified nanoclay by shear stress occurring during agitation, to a longitudinal size of 10 to 200 nm, and then, homogeneously dispersing the same in the molten and compressed polyester resin, discharging the polyester resin, in which the nanoclay is homogeneously dispersed, under agitation, and pelletizing the discharged polyester resin composition.

The organo-modified nanoclay may be added in an amount of 0.05 to 5 wt. %, the phosphorous-based flame retardant may be introduced in an amount of 0.05 to 5 wt. % in terms of phosphorous content, and the chain extender may be introduced in an amount of 0.1 to 5 wt. %.

A mixing ratio by weight of PET to PEN may range from 1:9 to 9:1.

The dispersion process may be executed in a region where an inner diameter of a shaft increases downstream of a flow direction of the molten polyester resin in the twin screw extruder and a region where the same is continuously maintained. The molten polyester resin may be compressed in the former, that is, the region where the inner diameter of the shaft is increased. In the region where the inner diameter of the shaft is continuously maintained, the organo-modified nanoclay may be homogeneously dispersed in the molten polyester resin by shear stress.

The region where the inner diameter of the shaft increases downstream of the molten polyester resin flow direction and the region where the inner diameter of the shaft is continuously maintained may be repeated at least twice.

The phosphorous-based flame retardant may be physically dispersed in the polyester resin composition or chemically reacted with the same.

The chain extender may be a chain extender having an epoxy functional group.

According to an exemplary embodiment, 0.05 to 5 wt. % of silane, a silane derivative, siloxane or a siloxane derivative may be introduced into the twin-screw extruder.

According to an exemplary embodiment, 0.001 to 0.01 wt. % of a metal salt may be introduced into the twin-screw extruder.

According to an exemplary embodiment, 0.05 to 5 wt. % of a thermal stabilizer may be added to the twin-screw extruder.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
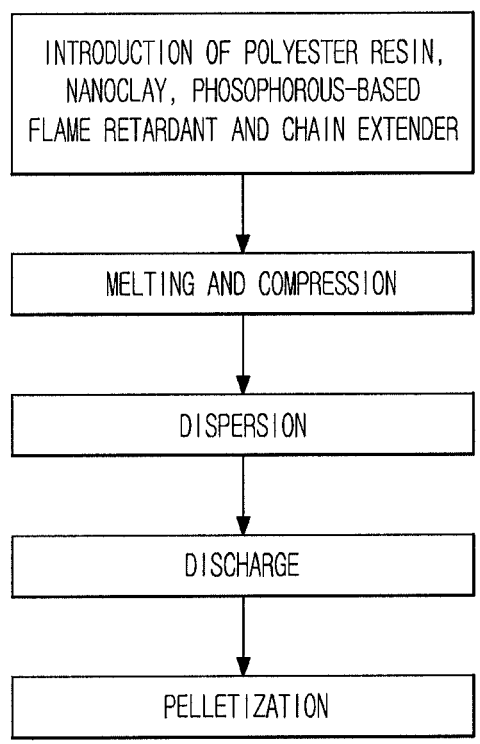
FIG. 1 illustrates a method for preparation of a polyester resin composition according to an exemplary embodiment of the present invention.

Reference will now be made in detail to the embodiments of the present disclosure, examples of which are illustrated in the accompanying drawings, wherein like reference numerals refer to the like elements throughout.

According to an aspect of the present invention, a transparent and flame-retardant polyester resin composition includes a mixture of PET and PEN or a copolymer thereof; 0.05 to 5 wt. % of organo-modified nanoclay, 0.05 to 5 wt. % of phosphorous-based flame retardant in terms of phosphorous content, and 0.1 to 5 wt. % of a chain extender.

The organo-modified nanoclay may have a longitudinal size of 100 to 200 nm and be homogeneously dispersed in the mixture of PET and PEN or the copolymer thereof.

Polyester resin generally exhibits excellent physical/chemical properties as well as mechanical/electrical features, and therefore, has been used in a broad range of applications including, for example, electric/electronic equipment, automobiles, office supplies, or the like.

Polyethylene terephthalate (PET) is a polymer widely used in textiles and various other industrial materials. However, this compound has a low crystallization speed, and suffers from difficulties in injection molding. In order to overcome such defects, polyethylene naphthalate (PEN) having higher glass transition temperature and melting temperature than PET, and excellent shape stability and mechanical properties by substituting benzene rings of PET with naphthalene rings, has been developed. However, PEN exhibits a high melt viscosity due to naphthalate rings and such a high melt viscosity may cause a problem of deteriorated processing ability.

An exemplary embodiment of the present invention uses a mixture of PET and PEN or a copolymer of PEN-PET formed through reaction and melting processing, in order to enhance formability and processing ability of PET and PEN.

A mixing ratio by weight of PET to PEN may range from 1:9 to 9:1 (wt:wt).

To improve heat resistance and combustion delay effects, a polyester resin composition may include 0.05 to 5 wt. % of the organo-modified nanoclay.

By exfoliation of the nanoclay having a silicate lamellar structure in units of nano-sized sheets and dispersing the same, low mechanical properties of the polyester may be improved.

The planar silicate as a basic unit of clay is difficult to exfoliate and disperse in a resin due to strong Vander-Waals attraction. Therefore, a melting compound method that includes compressing and melting the polyester resin, inserting the molten polyester resin between silicate layers, and dispersing clay sheets through mechanical mixing, may be employed.

Organo-modification of the nanoclay may enhance affinity between polyester resin and a silicate layer, thus increasing exfoliation effects of the nanoclay while maximizing dispersing effects thereof.

When non-organomodified nanoclay is subjected to exfoliation through melt compounding, it may be exfoliated to a size of more than 300 nm. On the other hand, the organo-modified nanoclay may be exfoliated to the extent of about 10 to 200 nm.

The organo-modified nanoclay may be added in an amount of 0.05 to 5 wt. % to the polyester resin composition. If a content of the organo-modified nanoclay is less than 0.05 wt. %, an increase in flame retardancy is reduced. When the content exceeds 5 wt. %, transparency and mechanical strength may be deteriorated.

In order to endow flame retardancy to the polyester resin composition, the phosphorous-based flame retardant may be added in an amount of 0.05 to 5 wt. % in terms of phosphorous content.

The phosphorous-based flame retardant may be physically dispersed in the polyester resin composition or chemically combined with the same. If the phosphorous-based flame retardant is physically dispersed in the polyester resin composition, like the nanoclay, it may be homogeneously dispersed in the polyester resin composition through shear stress generated by rotation of the twin-screw extruder.

The phosphorous-based flame retardant may be phosphoric acid ester, phosphate chemically similar to the phosphoric acid ester, pyrophosphate, phosphonate, metal-substituted phosphinate, phosphanate, nitrogen composite flame retardants, phosphazine compounds, or the like, which may be used alone or in combination of two or more thereof.

Examples of the phosphoric acid ester may include a monomer having an aromatic group such as triphenylphosphate, trixylenylphosphate, tricresylphosphate, etc., a monomer having at least two different aromatic groups such as resorcinyldiphenyl phosphate, phenyldiresorcinyl phosphate, cresyldiphenyl phosphate, xylenyldiphenyl phosphate, phenyldiisopropylphenyl phoshoate, etc., and the like, without particular limitation thereto. Dimers or higher oligomers, or polyphosphate may also be used.

Examples of the metal-substituted phosphinate may include magnesium phosphinate, calcium phosphinate, aluminum phosphinate, or the like.

The phosphorous-based flame retardant may be added in an amount of 0.05 to 5 wt. % in terms of phosphorous content. In terms of phosphorous content, if the amount of the phosphorous-based flame retardant is less than 0.05 wt. %, flame retardancy is decreased. When the content exceeds 5 wt. %, heat resistance may be deteriorated.

The polyester resin composition may include 0.01 to 5 wt. % of the chain extender.

The chain extender may be a chain extender having an epoxy functional group. The chain extender having an epoxy functional group is any one functioning to extend chains. Such a chain extender having an epoxy functional group may include, for example, divalent or polyvalent epoxide, epoxy resin or other compounds having at least two epoxy radicals, or the like, without being particularly limited thereto.

If an amount of the chain extender is less than 0.1 wt. %, reaction and discharge effects are insignificant. When the amount of the chain extender exceeds 5 wt. %, haze may occur to thereby decrease transparency.

The transparent and flame-retardant polyester resin composition may further include 0.05 to 5 wt. % of silane, a silane derivative, siloxane or a siloxane derivative.

The silane derivative may include organo-modified silanes such as alkoxysilane, methoxysilane, ethoxysilane, arylsilane, etc., while the siloxane derivative may include organo-modified siloxanes such as alkoxysiloxane, methoxysiloxane, ethoxysiloxane, arylsiloxane, etc.

The organo-modified silane or organo-modified siloxane may provide lubrication to a plastic material. These compounds may increase scratch-resistance and/or mar-resistance while decreasing a surface friction coefficient of plastic.

If less than 0.05 wt. % of silane, a silane derivative, siloxane or a siloxane derivative is added, satisfactory abrasion resistance (i.e., mar-resistance) may not be attained. When the amount is more than 5 wt. %, a problem of deteriorated transparency may occur.

The polyester resin composition may also include 0.001 to 0.1 wt. % of a metal salt as a catalyst catalyzing an esterification reaction between PET and PEN. For example, organo-titanate, dibutyltin dilaurate, tin-organic compounds, germanium dioxide, antimony trioxide, antimony triacetate, antimony glycolate, antimony oxide, zirconium oxide, molybdenum oxide, tungsten oxide, tin oxide, copper oxide, zinc oxide, aluminum oxide, nickel oxide, ferric oxide, manganese oxide, $TiO_2$, $GeO_2$, or the like, in the form of metal oxides, may be used in melt polymerization.

To improve compatibility between PET and PEN and prevent heat decomposition of the flame retardant, 0.05 to 5 wt. % of a thermal stabilizer may be added. According to an exemplary embodiment the thermal stabilizer may include a thioester stabilizer, a phosphate-based antioxidant, or the like, without being particularly limited thereto.

The polyester resin composition may include a compatibilizer as required. The compatibilizer may include oxazole, or the like, without being particularly limited thereto. According to an exemplary embodiment, any compatibilizer which can improve blending at an interface between PET and PEN may be used. Adding the compatibilizer may improve blending of PET and PEN, and enhance mechanical properties as well as flame retardancy of the polyester resin composition. An amount of the compatibilizer added to the composition may be determined within a range in which flame retardancy and transparency of the composition are not inhibited, without particular limitation thereto.

An alternative additive, such as generally added to a polyester resin composition in a mixing or molding process of polyester resin, in a certain amount not adversely effecting physical properties of the resin, such as heat resistant agents, oxidation inhibitors, weatherproofing agents, antioxidants, lubricants, release agents, thermal stabilizers, flow promoters, plasticizers, flow improvers, or the like, may be added.

A method for preparation of a transparent and flame-retardant polyester resin composition, with reference to the accompanying drawings is disclosed.

Figure 2:
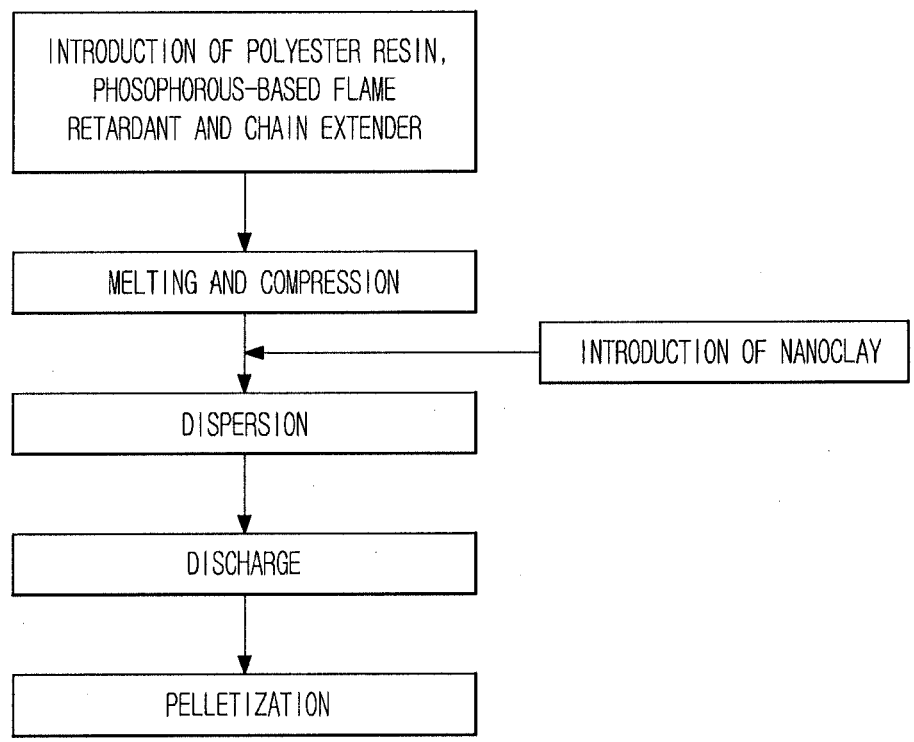
FIG. 2 illustrates a method for preparation of a polyester resin composition according to another exemplary embodiment of the present invention.
Figure 3:
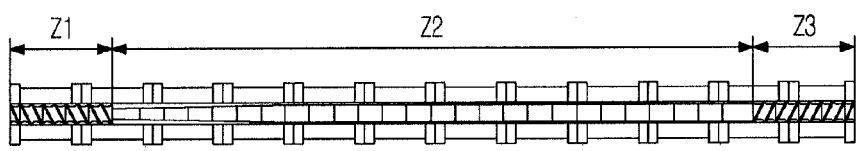
FIG. 3 is a cross-sectional view illustrating a twin-screw extruder employed in preparing a polyester resin composition according to an exemplary embodiment of the present invention.

FIG. 1 illustrates processes of a method for preparation of a polyester resin composition according to an exemplary embodiment of the present invention, FIG. 2 illustrates processes of a method for preparation of a polyester resin composition according to another exemplary embodiment of the present invention, and FIG. 3 is a cross-sectional view illustrating a twin-screw extruder employed in preparing a polyester resin composition according to an exemplary embodiment of the present invention.

According to another aspect of the present invention, a method is provided for preparation of a transparent and flame-retardant polyester resin composition including introducing a mixture of PET and PEN or a copolymer thereof, organo-modified nanoclay, a phosphorous-based flame retardant and a chain extender into a twin-screw extruder, mixing, melting and compressing the mixture under agitation in the twin-screw extruder, exfoliating the organo-modified nanoclay through shear stress occurring during agitation, to a longitudinal size of 10 to 200 nm, and then, homogeneously dispersing the same in the molten and compressed polyester resin, discharging the polyester resin, in which the nanoclay is homogeneously dispersed, under agitation, and pelletizing the discharged polyester resin composition.

According to an exemplary embodiment of the present invention, a method is provided for preparation of a transparent and flame-retardant polyester resin composition, the method including introducing a mixture of PET and PEN or a copolymer thereof, a phosphorous-based flame retardant and a chain extender into a twin-screw extruder, mixing, melting and compressing the mixture under agitation in the twin-screw extruder adding organo-modified nanoclay to the molten and compressed polyester resin, exfoliating the organo-modified nanoclay through shear stress occurring during agitation, to a longitudinal size of 10 to 200 nm, and then, homogeneously dispersing the same in the molten and compressed polyester resin, discharging the polyester resin, in which the nanoclay is homogeneously dispersed, under agitation, and pelletizing the discharged polyester resin composition.

According to an exemplary embodiment, PET, PEN, a phosphorous-based flame retardant, nanoclay, a chain extender and other additives may be introduced into a twin-screw extruder, for example, KE-45 (Korea) having L/D ratio of 40 equipped with a screw shaft having an inner diameter of 45 mm (see, FIG. 3). The raw materials are sequentially subjected to melting, compression, dispersion and discharging processes while passing through the twin-screw extruder.

In the melting/compression process, PET and PEN in a solid state are melted to form a liquid resin by increasing a temperature of the extruder, for example, from 280 to 290° C. If PET and PEN are in solid and liquid states, these compounds remain in the extruder until completely melted while maintaining the temperature of the extruder at 270 to 280° C. Z1 shown in FIG. 3 is a part of the twin-screw extruder on which the melting/compression process is conducted, and has a spiral screw rotating, for example, at a speed of 230 to 250 rpm. PET, PEN, the phosphorous-based flame retardant and the chain extender are molten and compressed while passing through the spiral screw.

During the melting/compression process, esterification reaction between PET and PEN is performed in the presence of a metal salt as a catalyst. Using a compatibilizer, blending at the interface between PET and PEN may be improved. The phosphorous-based flame retardant may be chemically combined with the polyester resin, thus improving flame retardancy of the polyester resin composition.

In the melting/compression process, when a moving speed of the molten material is relatively low and the temperature of the twin-screw extruder is high, the resin composition may be uniformly mixed during esterification.

In a dispersion process, nanoclay may be added to the completely molten polyester resin and homogeneously dispersed therein. A temperature during dispersion is maintained in the range, for example, of 255 to 265° C. The molten material flows along the twin-screw extruder at a speed, for example, of 230 to 250 rpm.

Z2 shown in FIG. 3 is a shaft part on which the dispersion process is conducted. The shaft has a region in which the inner diameter of the shaft increases downstream of a flow direction of the molten material and the other region in which the inner diameter of the shaft is constant. The molten material is subjected to compression through rotation, in the region in which the inner diameter of the shaft increases downstream of the flow direction of the molten material. The nanoclay is exfoliated and dispersed in the molten polyester resin through shear stress generated by rotation, in the other region in which the inner diameter of the shaft is constant without variation. The process is repeated at least twice, for example, in the region in which the inner diameter of the shaft increases downstream of the flow direction of the molten material and in the other region in which the inner diameter of the shaft is constant, in order to successively increase shear stress, thereby maximizing dispersion.

Together with PET and PEN, 0.05 to 5 wt. % of the organo-modified nanoclay may be introduced into the extruder. The nanoclay may be added to the molten material during a dispersion process, as shown in FIG. 2.

The organo-modified nanoclay may be exfoliated through delamination by compression and shear stress during the dispersion process. According to an exemplary embodiment the method is advantageous in that nanoclay in a dried state can be directly dispersed in a molten material, compared to a conventional method which comprises preliminarily dispersing nanoclay in an organic solvent, then, dispersing the treated nanoclay in a polymer resin.

In the dispersion process, the phosphorous-based flame retardant may be dispersed together with the nanoclay in the molten polyester resin.

Following the dispersion process, a discharging process may be conducted. As shown in Z3 of FIG. 3, the discharging process is executed downstream of the flow direction of the molten material which is treated in the dispersion process. Another spiral screw having a helix angle ('helical screw') in the opposed direction of the spiral screw used in the melting/compression process may be arranged in Z3. The resin composition containing the nanoclay dispersed during the dispersion process is compressed by the helical screw, and then, discharged through a discharge die. The resin composition is maintained, for example, at 265 to 275° C. while compressing the resin composition and, for example, at 275 to 285° C. while discharging the same out of the discharge die. The discharged resin composition may be rapidly cooled in a cooling apparatus such as a water bath, followed by pelletizing and drying in an oven. The cooling temperature may be maintained at a lower level than a glass transition temperature of a copolymer of PET and PEN.

The dried pellets may be subjected to injection molding, for example, at 260 to 270° C., resulting in a shaped product.

Exemplary embodiments of the present invention are disclosed in the following examples.

Example 1

In Example 1, the polyethylene terephthalate resin (PET) was SKY PETBL 8050 (manufactured by SK Chemical, Korea) and the polyethylene naphthalate resin (PEN) was Teonex TN 8065S (manufactured by Teijin Ltd., Japan). Organo-modified nanoclay used was Cloisite 93A (manufactured by Southern Clay Products, USA).

By mixing PET and PEN in a ratio by weight of 2:8, a resin mixture was prepared and introduced into a twin screw extruder (L/D=40, diameter (ø)=45 mm, KE-45, Korea) through a hopper, together with Cloisite 93A. PET, PEN and the organo-modified nanoclay passing through the twin-screw extruder were subjected to melting/compression, dispersion and discharging processes.

A temperature was set to 280° C. and then 270° C. for the melting/compression process, 260° C. for the dispersion process, and 270° C. or 280° C. for the discharging process, respectively. A rotation speed in each of the processes was the same of 260 rpm.

An extrudate resulting from these processes was rapidly cooled in a water bath, followed by pelletization. The obtained pellets were dried in an oven and stored before injection molding.

Comparative Example 1

Pellets were fabricated by the same procedures as described in Example 1, except that a typical twin-screw extruder equipped with a screw having three (3) kneading blocks was employed.

PET, PEN and the organo-modified nanoclay passing through the twin-screw extruder having 3 kneading blocks were subjected to melting/compression, dispersion and discharging processes.

A temperature was set to 290° C. for the melting/compression process, 290° C. for the kneading process, 300° C. for the dispersion process, and 300° C. for the discharging process, respectively.

TABLE 1

| | Extrusion temperature (° C.) | Residence time (min) | PEN | PET | Content of nanoclay (wt. %) | Clay size (TEM, nm) | Transparent |
|---|---|---|---|---|---|---|---|
| Example 1 | 280 | 5 | 80 | 20 | 1 | 100 | 87 |
| Comparative Example 1 | 300 | 3 | 80 | 20 | 1 | 300 | 84 |

As disclosed in TABLE 1, the organo-modified nanoclay in Example 1 was exfoliated to a particle size of 100 nm in PET/PEN. Also, the polyester resin containing the organo-modified nanoclay exfoliated to the particle size of 100 nm and dispersed therein according to Example 1 had higher transparency, compared to the polyester resin containing the nanoclay exfoliated to a particle size of 300 nm and dispersed therein in Comparative Example 1.

Figure 4:
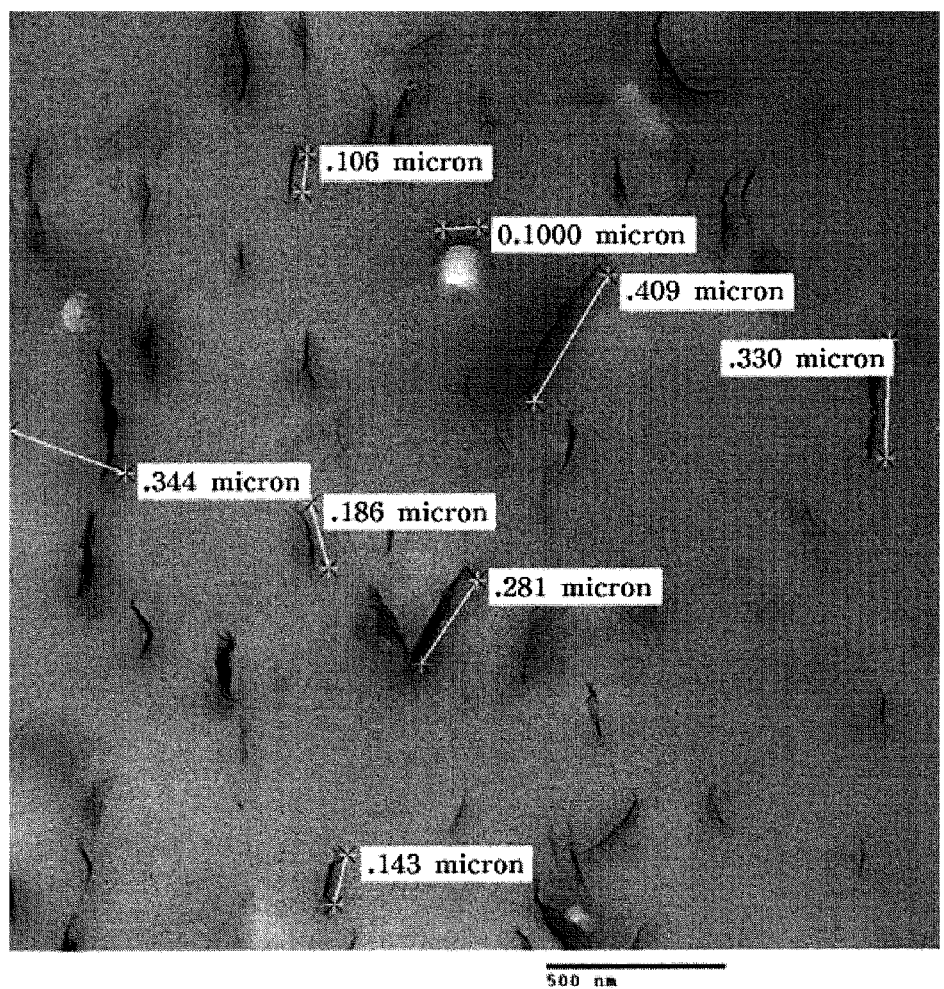
FIG. 4 is an exemplary scanning electron microscope (SEM) micrograph showing polyester resin in which organo-modified nanoclay is exfoliated and dispersed according to an exemplary embodiment of the present invention.
Figure 5:
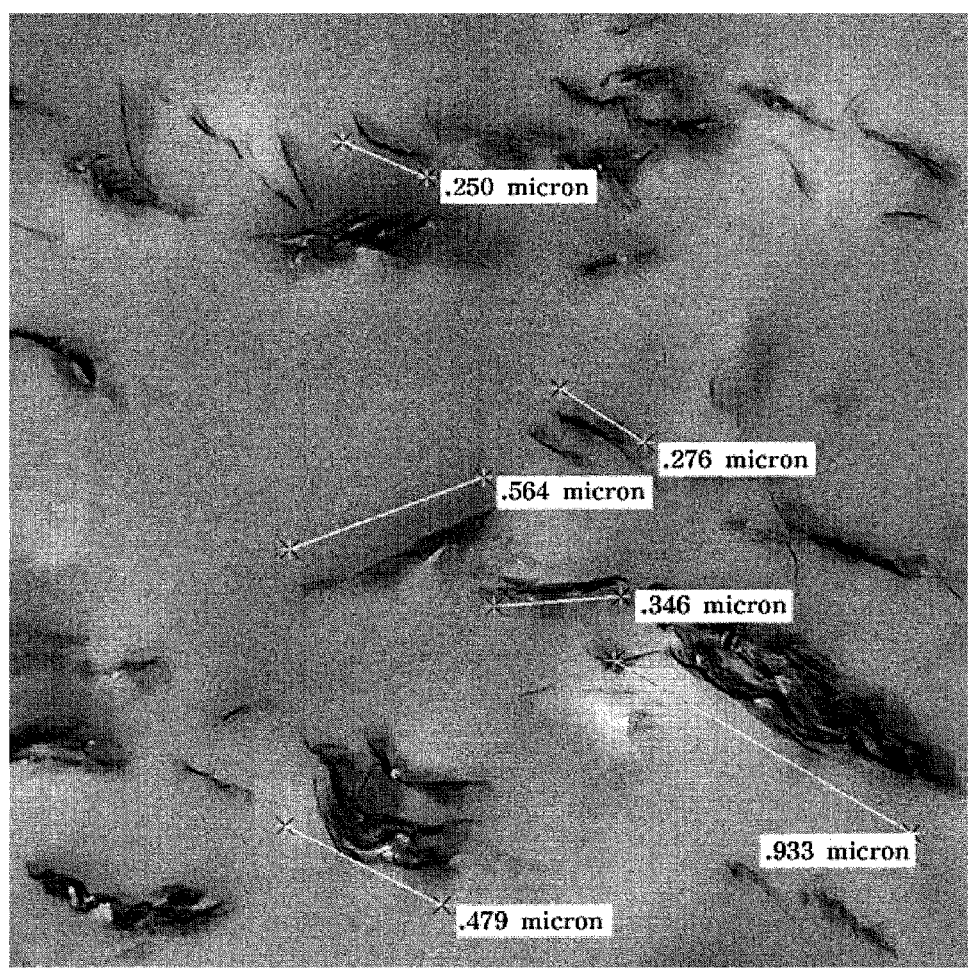
FIG. 5 is an exemplary SEM micrograph showing polyester resin in which organo-modified nanoclay is exfoliated and dispersed according to Comparative Example 1.

FIG. 4 is an example SEM micrograph illustrating polyester resin in which organo-modified nanoclay is exfoliated and dispersed according to Example 1 according to an exemplary embodiment of the present invention, and FIG. 5 is an example SEM micrograph showing polyester resin in which organo-modified nanoclay is exfoliated and dispersed according to Comparative Example 1.

As illustrated in FIG. 4, the organo-modified nanoclay treated through the melting/compression, dispersion and discharging processes was exfoliated to a particle size of 100 nm, and then, homogeneously dispersed in the polyester resin.

Experimental Example 1

In the following examples and comparative examples, the polyethylene terephthalate resin (PET) was SKY PETBL 8050 (manufactured by SK Chemical, Korea) and the polyethylene naphthalate resin (PEN) was Teonex TN 8065S (manufactured by Teijin Ltd., Japan). Organo-modified nanoclay used was Cloisite 93A (manufactured by Southern Clay Products, USA). Cloisite 93A was treated with 95 meq. of methylbis(hydrogenated-tallow) ammonium per 100 g of clay, and with 38.4 wt. % of organic content and $d_{001}$ spacing of 24.3 Å. Also, non-organomodified nanoclay used was Cloisite Na+ (manufactured by Southern Clay Products, USA), which is a pure montmorillonite without organo-modification.

As a flame retardant, H-205 manufactured by Kolon Industries (Korea) was used. In addition, ADR 4368-C (BASF Co. Ltd., Germany) was used as a chain extender.

Example 2

PET and PEN in a ratio by weight of 8:2 (wt:wt), 0.4 wt. % of a phosphorous-based flame retardant in terms of phosphorous content, 0.5 wt. % of nanoclay Cloisite 93A and 0.2 wt. % of a chain extender were reacted and extruded by the twin-screw extruder shown in FIG. 3 (L/D=40, diameter (ø)=45 mm, KE-45, Korea). Conditions in the twin-screw extruder were substantially the same as those described in Example 1.

Example 3

Example 3 was substantially the same as Example 2, except that the amount of the nanoclay Cloisite 93A was increased to 1 wt. %.

Example 4

Example 4 was substantially the same as Example 2, except that the amount of the phosphorous-based flame retardant was increased to 0.8 wt. % in terms of phosphorous content.

Example 5

Example 5 was substantially the same as Example 3, except that a ratio of PET to PEN is 2:8 (wt:wt).

Example 6

Example 6 was substantially the same as Example 5, except that the amount of the nanoclay Cloisite 93A was increased to 1 wt. %.

Comparative Example 2

PET and PEN in a ratio by weight of 2:8 (wt:wt), 0.4 wt. % of a phosphorous-based flame retardant in terms of phosphorous content, 7 wt. % of nanoclay Cloisite Na+ and 0.2 wt. % of a chain extender were reacted and extruded by the twin-screw extruder described in Example 1. Conditions in the twin-screw extruder were substantially the same as those described in Example 1.

Comparative Example 3

PET and PEN in a ratio by weight of 2:8 (wt:wt), 0.8 wt. % of a phosphorous-based flame retardant in terms of phosphorous content, 0.5 wt. % of nanoclay Cloisite Na+ and 0.2 wt. % of a chain extender were reacted and extruded by the twin-screw extruder described in Example 1. Conditions in the twin-screw extruder were substantially the same as those described in Example 1.

Comparative Example 4

Comparative example 4 was substantially the same as Comparative Example 3, except that a ratio of PET to PEN was 8:2 (wt:wt).

Comparative Example 5

Comparative example 5 was substantially the same as Comparative Example 4, except that nanoclay was not used.

Comparative Example 6

Comparative example 6 was substantially the same as Comparative Example 4, except that the nanoclay and the chain extender were not used.

After drying pellets obtained through extrusion processing in each of Examples 2 to 6 and Comparative Examples 2 to 6, in an oven at 120° C., the dried pellets were subjected to injection molding to produce a specimen. After measuring flame retardancy, transparency, optical transparency and surface hardness of the specimen according to the following procedures, the measured results are shown in TABLE 3.

(1) Flame Retardant Test

According to a UL94 flammability test method defined by Underwriter's Laboratory Inc., flame retardancy was measured using a test sample having a thickness of 1.2 mm. This method may be used to evaluate flame retardancy by applying a burner flame to an upright specimen for 10 seconds and measuring an after-flame time or determining drip properties of the specimen. The after-flame time means a duration during which the specimen continues naked ignition after an ignition source is removed from the specimen. Drip-Ignition of a face (by drips) is determined on the basis of ignition of an indication face about 300 mm below a bottom end of the specimen by a drip material of the specimen. Flammability ratings are shown in TABLE 2.

TABLE 2

| Section | V2 | V1 | V0 | HB |
|---|---|---|---|---|
| After-flame time of each sample | Less than 30 seconds | Less than 30 seconds | Less than 10 seconds | Least flammable, that is, 'self-extinguishing' |
| Overall after-time of five samples | Less than 250 seconds | Less than 250 seconds | Less than 50 seconds | |
| Drip-ignition of face | Observed | Not observed | Not observed | |

(2) Transparency

Transparency was measured from an injected specimen having a thickness of 2 mm by means of SF 600 PLUSCT (DataColor Co.) (a light source: D65, 10° Standard Observer)

(3) Scratch Resistance

Surface hardness (scratch resistance) was measured at 0.5 kgf according to ASTM D 3363.

TABLE 3

| | | Ex. 2 | Ex. 3 | Ex. 4 | Ex. 5 | Ex. 6 | Com. Ex. 2 | Com. Ex. 3 | Com. Ex. 4 | Com. Ex. 5 | Com. Ex. 6 |
|---|---|---|---|---|---|---|---|---|---|---|---|
| Composition | PET | 8 | 8 | 8 | 2 | 2 | 2 | 2 | 8 | 8 | 8 |
| | PEN | 2 | 2 | 2 | 8 | 8 | 8 | 8 | 2 | 2 | 2 |
| | Content of Phosphorous-based flame retardant (wt. %) | 0.4 | 0.4 | 0.8 | 0.4 | 0.4 | 0.4 | 0.8 | 0.8 | 0.8 | 0.8 |
| | Size of nanoclay (TEM, nm) | 100 | 100 | 100 | 100 | 100 | 100 | >500 | >500 | — | — |
| | Content of nanoclay (wt. %) | 0.5 | 1.0 | 0.5 | 0.5 | 1.0 | 7 | 0.5 | 0.5 | — | — |
| | Content of chain extender (wt. %) | 0.2 | 0.2 | 0.2 | 0.2 | 0.2 | 0.2 | 0.2 | 0.2 | 0.2 | — |
| Performance | Transparency (%@2 mm) | 85 | 83 | 80 | 85 | 84 | 63 | 58 | 59 | 83 | 87 |
| | Flammability ratings (UL 94) | V1 | V0 | V0 | V0 | V0 | V0 | V0 | V0 | V2 | V2 |
| | Drip properties (gm@20 seconds) | 0.60 | 0.47 | 0.52 | 0.55 | 0.39 | 0.30 | 0.54 | 0.55 | 0.68 | 0.74 |
| | Surface hardness (pencil hardness) | HB | F | HB | 2H | 2H | 2H | F | B | B | B |

As shown in TABLE 3, in Examples 2 and 3, an amount of drips after 20 second ignition according to a UL94 flammability test is considerably reduced when a content of the organo-modified nanoclay is increased and, because of improved drip properties, flame retardancy was enhanced from V1 to V0. In addition, surface hardness was improved by increasing the content of the organo-modified nanoclay (HB→F).

In Examples 2 and 4, although a flammability rating was improved to V0 by increasing a content of the flame retardant from 0.4 wt. % to 0.8 wt. %, transparency was decreased. Accordingly, a composition having a high flammability rating of V0 could be discovered using organo-modified nanoclay that is exfoliated to less than 100 nm and dispersed while decreasing a content of a flame retardant.

Examples 5 and 6 where a composition ratio of PET to PEN is set to 2:8 (wt:wt) exhibit similar performances to Examples 2 and 3. That is, a highly transparent composition having a high surface hardness, a flammability rating of V0 and more than 80% transparency were observed.

In Comparative Example 2, a composition prepared by introducing 7 wt. % of the nanoclay had a flammability rating of V0 but showed deteriorated transparency.

As can be seen from Comparative Examples 3 and 4, if a size of the nanoclay exfoliated and dispersed in the polyester resin is more than 500 nm, favorable flame retardancy and drip properties were secured, while transparency was deteriorated to less than 60%. In the case of Comparative Examples 5 and 6, transparency was excellent but the flammability rating was V2, thus demonstrating that the nanoclay may be required to obtain desired flame retardancy.

Figure 6:
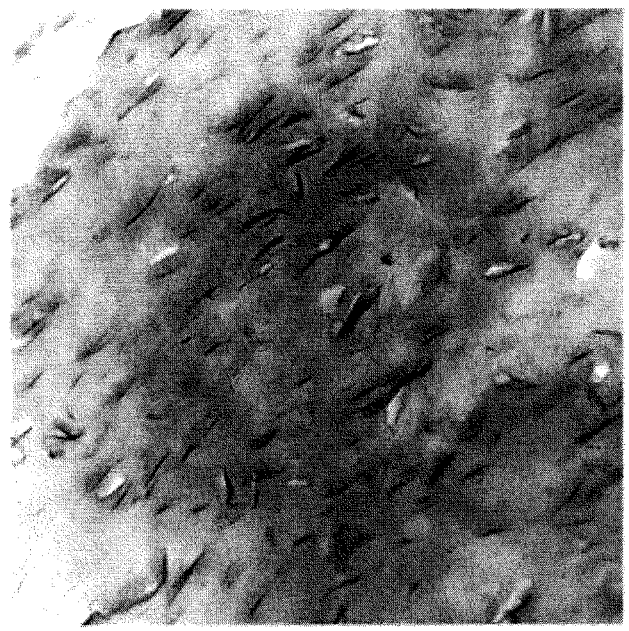
FIG. 6 is an exemplary SEM micrograph showing polyester resin in which organo-modified nanoclay is exfoliated and dispersed according to another exemplary embodiment of the present invention.
Figure 7:
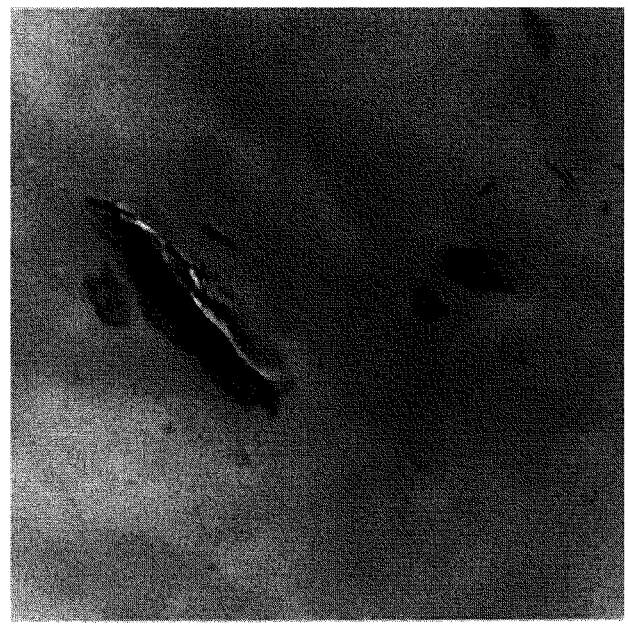
FIG. 7 is an exemplary SEM micrograph showing polyester resin in which non-organomodified nanoclay is exfoliated and dispersed.

FIG. 6 is an example SEM micrograph showing polyester resin in which organo-modified nanoclay is exfoliated and dispersed according to Example 5, and FIG. 7 is an example SEM micrograph showing polyester resin in which non-organomodified nanoclay is exfoliated and dispersed according to Comparative Example 2.

As shown in FIGS. 6 and 7, a degree of exfoliation of nanoclay and dispersibility thereof in polyester resin vary depending on whether the nanoclay is organo-modified. As shown in FIG. 6, the nanoclay was homogeneously dispersed in the polyester resin since it was organo-modified.

Experimental Example 2

To improve scratch resistance (surface hardness), organo-modified siloxane manufactured by Evonik Co. (Germany) was added. After adding the compound, flame retardancy, transparency, optical transparency and surface hardness were measured by the same procedures as described in Experimental Example 1. The measured results are shown in TABLE 4.

Example 7

Example 7 was substantially the same as Example 3 except that 0.5 wt. % of organo-modified siloxane, Tegomer H-Si6640P (Silane-copolyester, solid), was added.

Example 8

Example 8 was substantially the same as Example 3 except that 1.0 wt. % of organo-modified siloxane, Tegomer H-Si6640P, was added.

Example 9

Example 9 was substantially the same as Example 3 except that 2.0 wt. % of organo-modified siloxane, Tegomer H-Si6640P, was added.

TABLE 4

|  | Example 3 | Example 7 | Example 8 | Example 9 |
| --- | --- | --- | --- | --- |
| Content of 6640 P (wt. %) | 0 | 0.5 | 1.0 | 2.0 |
| Transparency (%@2 mm) | 83 | 81 | 79 | 75 |
| Flammability ratings (UL 94) | V0 | V0 | V0 | V0 |
| Surface hardness | F | F~H | H | H~2H |

As shown in TABLE 4, it was found that Examples 7 to 9 with addition of Tegomer H-Si6640P did not exhibit a considerable decrease in transparency, but, increased pencil hardness to F through 2H levels while maintaining flame retardancy, compared to Example 3 without adding the organo-modified siloxane.

Experimental Example 3

For the composition in Example 3, transparency, molecular weight and large surface injection properties of the composition, depending on content of a chain extender, in particular, a multifunctional chain extender, were investigated. As the chain extender, Joncry ADR-4368 was used. Since Joncry ADR-4368 has glycidyl methacrylate (GMA) as a reactive group, it can function to prevent a molecular weight of the resin from being decreased.

Comparative Example 7

Comparative example 7 was substantially the same as Example 3, except that the chain extender was not used.

Comparative Example 8

Comparative example 8 was substantially the same as Example 3, except that 0.03 wt. % of the chain extender was added.

Example 12

Example 12 was substantially the same as Example 3, except that 0.5 wt. % of the chain extender was added.

Comparative Example 9

Comparative example 9 was substantially the same as Example 3, except that 6 wt. % of the chain extender was added.

TABLE 5

|  | Example 3 | Comparative Example 7 | Comparative Example 8 | Example 12 | Comparative Example 9 |
| --- | --- | --- | --- | --- | --- |
| Content of ADR 4368 (wt. %) | 0.2 | 0 | 0.03 | 0.5 | 6 |
| Transparency (%@ 2 mm) | 83 | 84 | 84 | 81 | 74 |
| GPC MW | 35,200 | 27,000 | 27,600 | 38,000 | 39,500 |
| Large surface injection properties | 1 | 5 | 3 | 1 | 1 |

GPCMW: Weight average molecular weight by GPC

Large surface injection properties: The number of faults per 100 injections

Using TABLE 5, the data indicates that the molecular weight of the resin is substantially not increased when the amount of the chain extender was less than 0.05 wt. %, compared to a case without addition of the chain extender (Comparative Examples 7 and 8). On the other hand, when the amount of the chain extender exceeded 5 wt. %, transparency of the resin was deteriorated (Comparative Example 9).

Although preferred embodiments of the present invention have been described above, it is clearly understood that these embodiments do not particularly restrict the scope of the present invention. Accordingly, it would be appreciated by those skilled in the art that various substitutions, variations and/or modifications may be made in these embodiments without departing from the principles and spirit of the invention.

What is claimed is:

1. A transparent and flame-retardant polyester resin composition, comprising:

a mixture of polyethylene terephthalate (PET) and polyethylene naphthalate (PEN);

0.05 to 5 wt. % of organo-modified nanoclay;

0.05 to 5 wt. % of a phosphorous-based flame retardant in terms of phosphorous content; and 0.1 to 5 wt. % of a chain extender, wherein the nanoclay is homogeneously dispersed with a longitudinal size ranging from 10 to 200 nm in the mixture of PET and PEN, wherein a transparency of the polyester resin composition is more than 80%, and wherein the chain extender has an epoxy functional group.

2. The polyester resin composition according to claim 1, wherein a mixing ratio of PET to PEN ranges from 1:9 to 9:1 (wt:wt).

3. The polyester resin composition according to claim 1, wherein the phosphorous-based flame retardant is physically dispersed in the polyester resin composition.

4. The polyester resin composition according to claim 1, further comprising 0.05 to 5 wt. % of silane, a silane derivative, siloxane or a siloxane derivative.

5. The polyester resin composition according to claim 1, further comprising 0.05 to 5 wt. % of a metal salt.

6. The polyester resin composition according to claim 1, further comprising 0.05 to 5 wt. % of a thermal stabilizer.

7. A transparent and flame-retardant polyester resin composition comprising a mixture of polyethylene terephthalate (PET) and polyethylene naphthalate (PEN) including 0.05 to 5 wt. % of organo-modified nanoclay, 0.05 to 5 wt. % of a phosphorous-based flame retardant in terms of phosphorous content, and 0.1 to 5 wt. % of a chain extender, the transparent and flame-retardant polyester resin composition produced by a process comprising:
   homogeneously dispersing the nanoclay having a longitudinal size ranging from 10 to 200 nm in the mixture of PET and PEN.

\* \* \* \* \*